(12) United States Patent
Whitehead

(10) Patent No.: US 6,814,334 B1
(45) Date of Patent: Nov. 9, 2004

(54) METHOD AND APPARATUS FOR LIMITING MOVEMENT OF INSULATION DURING BUILDING CONSTRUCTION

(76) Inventor: Richard E. Whitehead, 24307 Spencer Ter., Magnolia, TX (US) 77355

( * ) Notice: Subject to any disclaimer, the term of this patent is extended or adjusted under 35 U.S.C. 154(b) by 0 days.

(21) Appl. No.: 09/519,145

(22) Filed: Mar. 6, 2000

(51) Int. Cl.[7] .............................. B25B 5/04; B25B 5/14
(52) U.S. Cl. .................... 248/228.4; 269/904; 269/239; 248/351
(58) Field of Search ............................ 248/351, 228.1, 248/228.4, 227.1, 227.2, 227.3, 227.4, 229.23, 231.51; 52/169.9, 293.3, 506.03; 269/97, 98, 237, 238, 239; 24/494, 516

(56) References Cited

U.S. PATENT DOCUMENTS

| | | | | |
|---|---|---|---|---|
| 225,345 A | * | 3/1880 | Clark | 248/227.4 |
| 419,379 A | | 1/1890 | Talbot | |
| 580,160 A | | 4/1897 | McEwen | |
| 583,099 A | | 5/1897 | Tompkins | |
| 1,136,701 A | * | 4/1915 | Morse | 269/140 |
| 1,619,749 A | * | 3/1927 | Murray | 269/209 |
| 2,464,672 A | | 3/1949 | Clapp | 248/226 |
| 2,510,436 A | | 6/1950 | Trammel | 311/21 |
| 2,892,207 A | * | 6/1959 | Olson | 118/500 |
| 3,169,033 A | * | 2/1965 | Chmiel | 294/15 |
| 3,667,711 A | * | 6/1972 | Kissel | 248/72 |
| 3,693,929 A | * | 9/1972 | Martin | 249/25 |
| 3,734,300 A | * | 5/1973 | Carter | 211/177 |
| 4,541,155 A | * | 9/1985 | Gagnon | 248/228 |
| 4,681,290 A | | 7/1987 | Crosbie | 248/225.31 |
| 4,868,943 A | | 9/1989 | Robichaud | 7/166 |
| 4,901,963 A | * | 2/1990 | Yoder | 24/489 |
| 5,161,762 A | | 11/1992 | Stewart et al. | 248/231.5 |
| 5,531,167 A | * | 7/1996 | Stevens et al. | 108/106 |
| 5,584,457 A | | 12/1996 | Fawcett | 248/229.1 |
| 5,647,102 A | * | 7/1997 | Sterling, Jr. | 24/494 |
| 5,758,430 A | * | 6/1998 | Holloway | 33/528 |
| 6,155,547 A | * | 12/2000 | Gatanas | 269/6 |

* cited by examiner

*Primary Examiner*—Anita King
*Assistant Examiner*—Jon Szumny
(74) *Attorney, Agent, or Firm*—Douglas W. Rommelmann; Andrews Kurth LLP

(57) ABSTRACT

An apparatus and method for restraining movement of insulation during construction of a metal frame building. The apparatus having a plate with an opening, a hook member received by the opening, and a restraint holder. The hook member engages a girt to hold the apparatus in position. A restraint member extends from the holder to reduce movement of insulation, generally draped from an upper portion of a building frame, caused by wind prior to attachment of siding on a metal frame building.

15 Claims, 5 Drawing Sheets

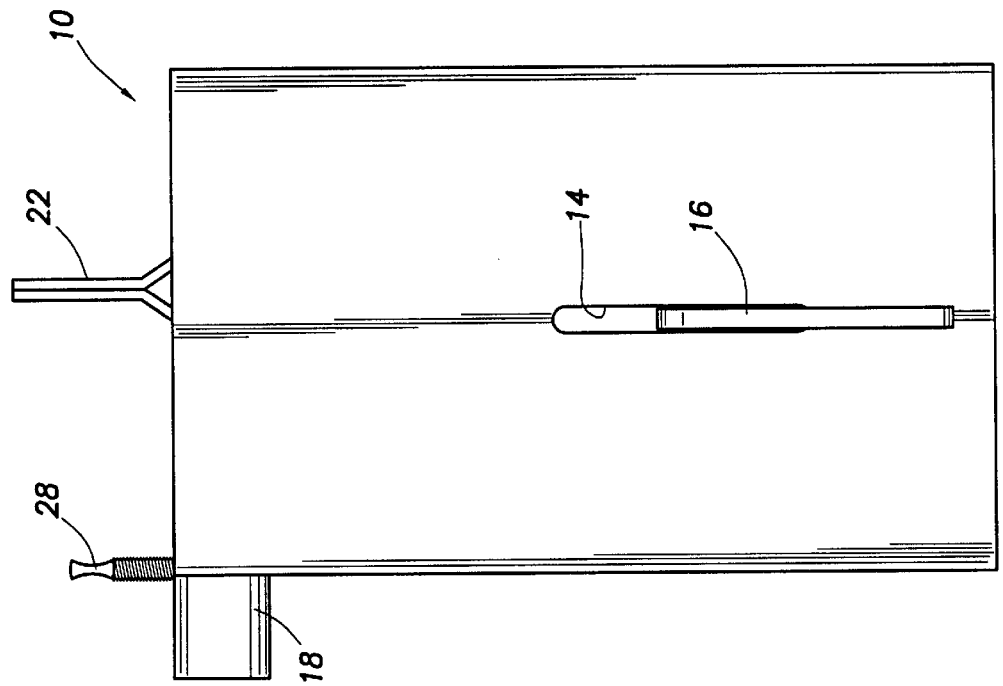
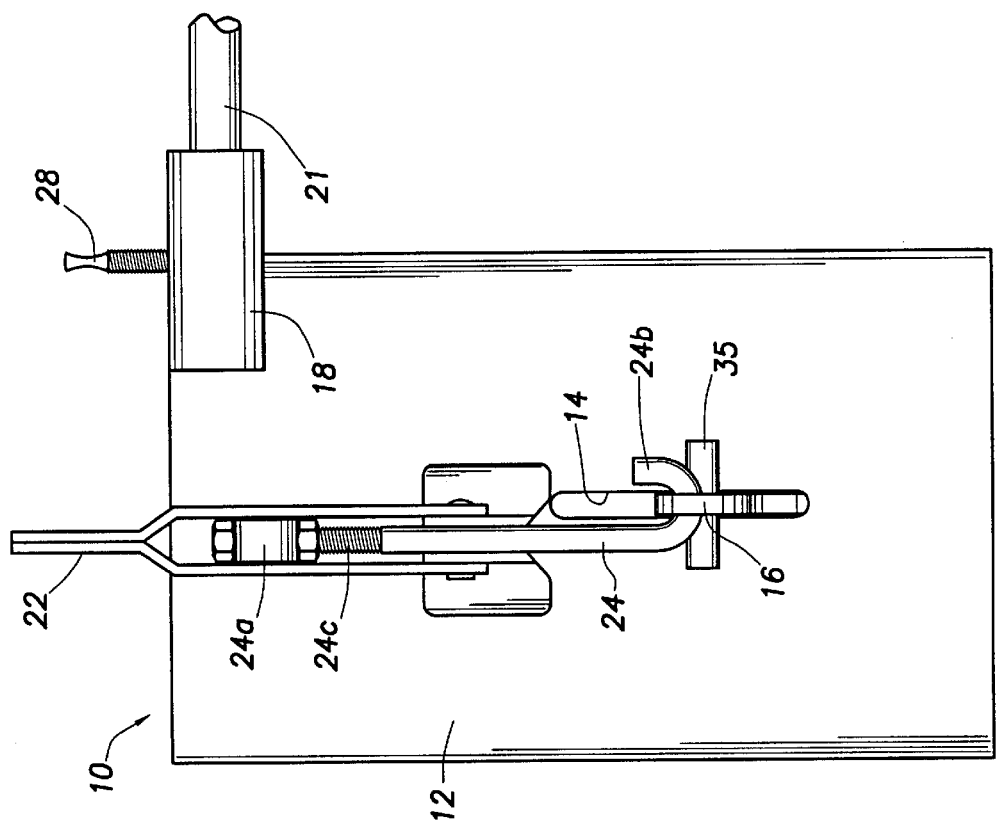

METHOD AND APPARATUS FOR LIMITING MOVEMENT OF INSULATION DURING BUILDING CONSTRUCTION

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to an apparatus for use during the construction of buildings, particularly metal frame buildings. More particularly, the present invention relates to an improved apparatus having a hook member and restraint for engaging a girt and limiting movement of insulation during construction of a building. The present invention also relates to a method of use of the apparatus to limit movement of insulation during construction of a building.

2. Description of the Related Art

During the construction of buildings, particularly metal frame buildings, insulation is commonly installed after the metal frame is erected but before siding is attached to the metal frame. One common method of installing the insulation involves attaching a portion of a roll of insulation to an upper beam or eave strut. The remaining portion of the insulation is allowed to unroll toward the ground. The insulation is commonly attached to the eave strut and unrolled prior to the siding being installed so that the insulation may be secured between the metal frame and the siding as the siding is attached, typically by screws, to the metal frame. The open building frame permits wind to blow through the building. The insulation, typically about six feet wide, has a very large surface area. Even a relatively light breeze may cause the insulation to undulate in a haphazard manner. The swinging movement of the insulation may cause the insulation to rip free of its attachment to an upper beam. Also, since insulation is often made from fiberglass, the swinging movement of the insulation presents a hazard to workers who may be struck by the swinging insulation which may cause fiberglass fibers to enter exposed skin of a worker.

One method of restraining the hanging insulation during construction of a metal frame building requires the use of a piece of half inch diameter rebar having a length of about eight and a half feet. The rebar has a U-shaped section that engages a girt, which is a horizontal metal beam between the vertical frame columns, and holds the remaining portion of the rebar in a position adjacent to the insulation. The U-shaped section may disengage from the girt when the insulation is blown around in a strong wind. Also, the U-shaped section may be accidentally disengaged when unintentionally struck by workers or construction equipment. Workers are then exposed not only to the normal hazards of the insulation, but also the risk of being struck by the falling steel rebar which could seriously injure or kill a person. Furthermore, the U-shaped section of the rebar creates a left handed or right handed rebar device which allows the rebar to extend in only one direction from a girt. This necessitates having at least two different types of U-shaped rebar to use as insulation restraints.

There exists a need for an improved apparatus for restraining the movement of insulation for use during construction of buildings. There exists a need for an improved apparatus for insulation restraint that more securely engages a girt. There exists a need for an apparatus for restraining the movement of insulation that lacks a center of asymmetry so only one type of insulation restraint is needed. There exists a need for an improved apparatus that may be operated with one hand. There exists a need for an improved method of restraining the movement of insulation during construction of a metal frame building.

SUMMARY OF THE INVENTION

The present invention provides an improved apparatus for limiting movement of insulation or other flexible materials during the construction of a building. The present invention provides an improved apparatus that more securely engages a girt. The improved apparatus is not left or right handed and permits a restraint member to extend to either side of the apparatus reducing the number of types of restraint devices required. One embodiment of the present invention permits one-handed operation for ease of use.

One embodiment according to the present invention provides an apparatus having a plate with an opening for receiving a hook member, a hook member, and a restraint holder for receiving a restraint member for limiting movement of insulation during windy working conditions.

The hook member may be sized and shaped to engage a standard girt.

The restraint holder may have a screw or pin to hold the restraint in place or, optionally, may be sized to hold the restraint in place by the use of friction.

Another embodiment according to the present invention includes a handle for holding the apparatus and operating the hook member to permit one-handed use of the apparatus. The apparatus may optionally have a support brace to which the handle is attached. Optionally the apparatus may have a locking screw or pin to prevent accidental disengagement of the apparatus.

One method according to the present invention includes attaching the insulation to an eave strut or other support; attaching a restraint apparatus to a girt, the apparatus having a plate having an opening, a hook member received by the opening, a restraint holder attached to the plate; and inserting a restraint member into the restraint holder such that the restraint member restrains the movement of the insulation.

Another method according to the present invention includes attaching the insulation to an eave strut or other support; attaching a restraint apparatus by retracting a handle, receiving the angled portion of a girt, releasing the handle to engage the girt with a hook point and inserting a restraint member into a restraint holder.

BRIEF DESCRIPTION OF THE DRAWINGS

For a further understanding of the nature, objects and advantages of the present invention, reference should be made to the following detailed description, read in conjunction with the following drawings, wherein like reference numerals indicate like elements and wherein:

FIG. 3 is a back elevational view, taken along lines 3—3 in FIG. 2, of the restraint apparatus with a restraint member secured in a restraint holder;

FIG. 4 is a front elevational view, taken along lines 4—4 in FIG. 2, of the apparatus with the girt being removed for clarity.

DETAILED DESCRIPTION OF INVENTION

Figure 1:
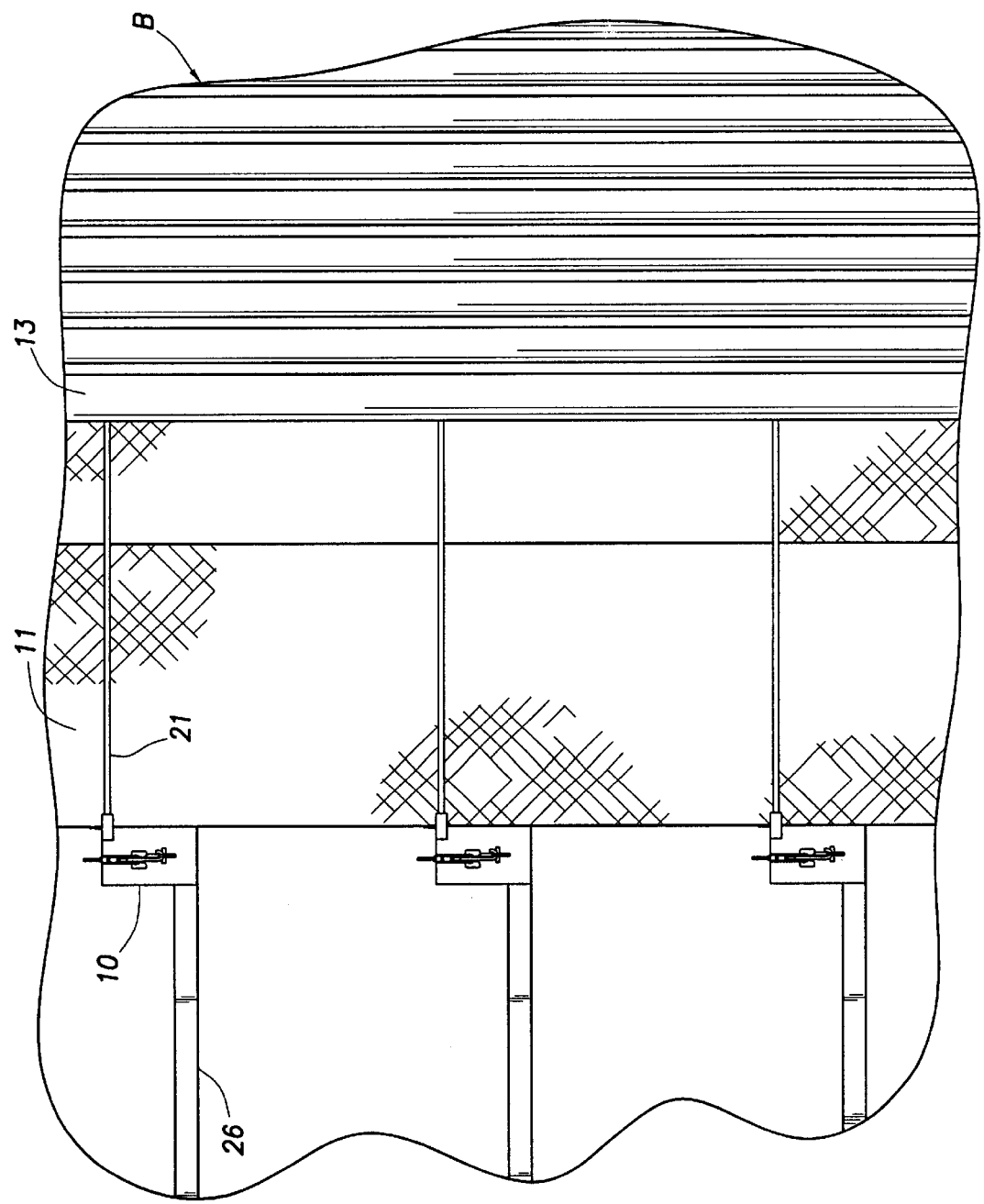
FIG. 1 is a side elevational view of a section of a frame building showing the restraint apparatus restraining insulation prior to application of siding.

The restraint apparatus according to a first embodiment of the present invention, generally designated 10, will now be described in detail with reference to FIGS. 1–4. With reference to FIG. 1, the restraint apparatus 10 allows a worker to restrict the movement of insulation 11, particularly on a windy day, by attaching the restraint apparatus 10 to a girt 26 during the installation of the insulation 11 and siding 13 to a metal frame building B. FIG. 1 shows one embodiment of the restraint apparatus 10 engaging a girt 26 with a restraint member 21 extending adjacent to insulation 11. As will be discussed below, the restraint member 21 restricts movement of the insulation 11 during the installation and attachment of siding 13 to the girts 26. The restraint apparatus 10 and the method of using the restraint apparatus 10 of the present invention provide improved safety over the existing use of rebar with a U-shaped end by more securely engaging the girt 26 and reducing accidental disengagement.

Figure 2:
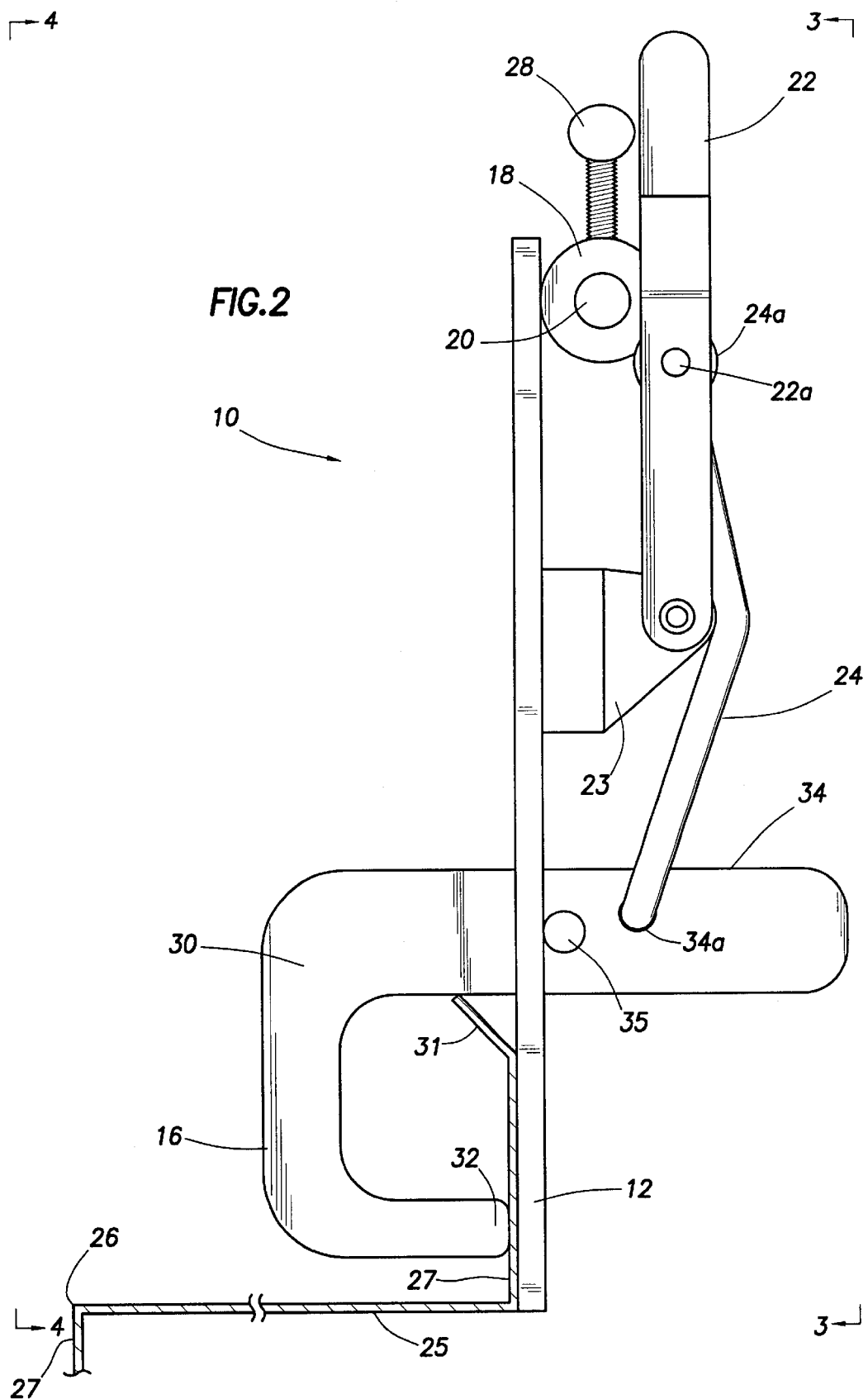
FIG. 2 is a side view of the restraint apparatus according to a first embodiment of the present invention showing a restraint apparatus engaging a girt in a locked position.

The first embodiment of the restraint apparatus or insulation restraining apparatus 10 is shown in FIGS. 1–4. Referring to FIGS. 2–4, the restraint apparatus 10 includes a plate 12, a hook member 16, and a restraint holder 18 having a bore 20 (FIG. 2). As shown in FIG. 3, the bore 20 of the restraint holder 18 receives a restraint member 21.

Still referring to FIGS. 2–4, the plate 12 includes an opening 14 through which the hook member 16 extends. Preferably, the opening 14 is a vertical elongated slot as shown in FIGS. 3 and 4. Referring to FIG. 2, the hook member 16 is generally J-shaped and includes a curved portion 30 terminating with a hook point 32. The hook member 16 also includes an arm 34 joined to the curved portion 30 and extending through the plate opening 14. In the preferred embodiment, the hook member 16 is pivotally connected to the plate 12. While acknowledging there are several ways of pivotally connecting the hook member 16 to the plate 12, FIGS. 2 and 3 illustrate one such suitable pivotal connection. In FIGS. 2 and 3, a pivot pin 35 is inserted through a hole 34a in the arm 34 of the hook member 16 and the pivot pin 35 is secured to the plate 12, as for example by welding. The hole 34a in the arm 34 is slightly larger than the diameter of the pivot pin 35 to allow pivotal movement of the hook member 16 relative to the plate 12.

Figure 2A:
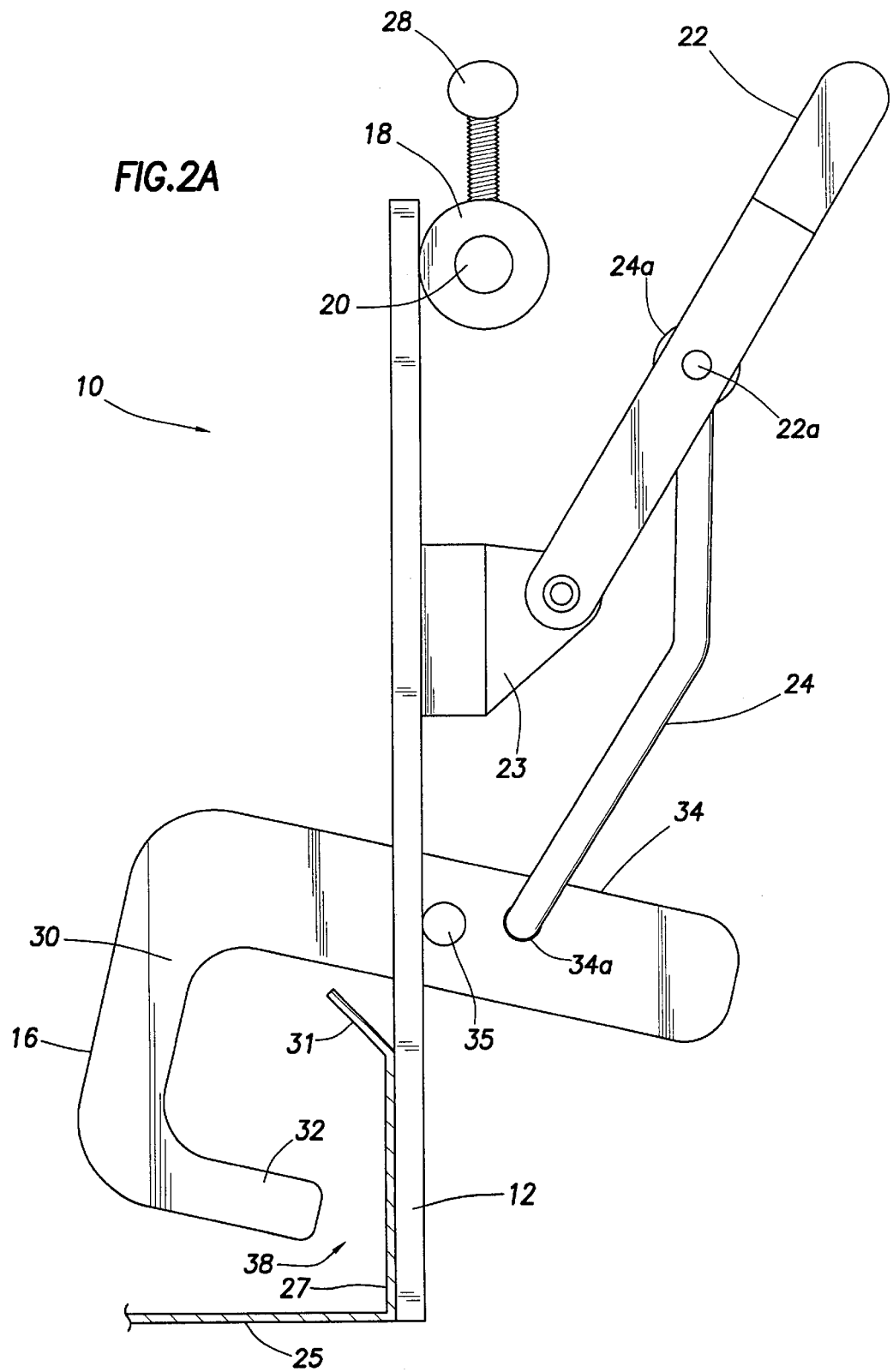
FIG. 2A is a side view of the restraint apparatus of FIG. 2 showing the restraint apparatus in an open position.

As shown in FIGS. 2 and 2A, the hook member 16 is pivoted about the pivot pin 35 via movement of a control lever 22 attached to the plate 12 or to a support 23 attached to the plate 12. Preferably, the lever 22 is pivotally attached to the plate 12 or support 23 by any conventional pivotal attachment device including, but not limited to, a screw, bolt, rivet or pin. The movement of the lever 22 is communicated to the hook member 16 by a connector rod 24 connected to the lever 22 and the hook member 16. Preferably, the connections of the rod 24 are pivot connections to allow relative angular movement between the joined components at the connection. As shown in FIGS. 2, 2A and 3, the pivot connection of the rod 24 and the lever 22 may be accomplished with a pin 22a inserted through a rod eye 24a and secured to the lever 22. The pivot connection of the rod 24 and the arm 34 may be accomplished with a rod hook 24b inserted through an arm hole 34a. It is to be understood that the pivot connections shown are merely for illustrative purposes and other types of connections are contemplated by the present invention.

Referring to FIG. 3, the rod eye 24a may be adjusted along the length of the rod threads 24c to alter the lever position at which the hook point 32 engages a girt 26 having a different wall thickness. The different thickness may be caused, for example, by gauge size, type of girt or structural member, or the presence of another structural element attached to the girt 26. The adjustable rod eye 24a permits the restraint apparatus 10 to be readily adapted to securely engage girts 26 or other structural elements of varying thicknesses.

As shown in FIG. 2, typically the girt 26 has a horizontal section 25 with a vertical extension 27 on each end of the horizontal section 25. The vertical extensions 27 each have an angled portion 31, which the hook member 16 must be sized to fit over in the unlocked position as illustrated in FIG. 2A. On a standard girt 26, the horizontal section typically has a width of either 8 inches or 10 inches. The vertical extensions 27 typically have a length of 4.5 inches. The girt 26 is typically made of 8 to 16 gauge metal.

Referring to FIG. 2A, the restraint apparatus 10 is installed in an unlocked position by placing the curved portion 30 of the hook member 16 over the angled portion 31 of the girt 26. The hook member 16 in an open position provides a gap 38 between the hook point 32 and the plate 12 to allow the angled portion 31 and the vertical extension 27 to pass through the gap 38. Preferably, the gap 38 is wider than the horizontal length of the angled portion 31 of the girt 26 for ease of installation of the restraint apparatus 10 on the girt 26. As the lever 22 pivots away from the plate 12 the rod 24 moves the arm 34 downward causing the curved portion 30 of the hook 16 to move upward into an open position for receiving the angled portion 31 of the girt 26. The open position of the hook member 16 permits a convenient vertical movement for attaching the restraint apparatus 10 on a girt 26. The hook member 16 is positioned such that the point 32 is located between the horizontal extension 25 and the angled portion 31 of the girt 26. The apparatus 10 is then secured in the desired position by pivotal movement of the lever 22 towards the top of the plate 12 and thus securely engaging the vertical extension 27 between the hook point 32 and the plate 12.

As shown in FIG. 2, as the lever 22 is moved into the locked position the hook member 16 engages the girt 26 from one side and the plate 12 engages the girt 26 from the opposite side. The pressure exerted on the girt 26 by the hook member 16 and the plate 12 along with the frictional forces holds the restraint apparatus 10 in the desired position on the girt 26. The lever 22 provides a positive lock to secure the apparatus 10 in place to reduce the accidental disengagement of the apparatus 10 from the girt 26. The restraint apparatus 10 has a lower likelihood of accidental disengagement compared to previous insulation restraining devices and provides increased safety for workers.

As shown in FIG. 3, the restraint holder 18 is generally located on the plate 12 above the opening 14. Alternatively, a portion of the plate 12 may extend below the girt 26 allowing the restraint holder 18 to be located below the girt 26 when in the locked position. The restraint holder 18 is preferably located such that the restraint member 21 extends above or below the girt vertical extension 27 contacted by the hook point 32 to avoid interfering with the attachment of the siding 13 to the girt 26. The restraint holder 18 is adapted to receive and hold the restraint member 21. The restraint holder 18 may be sized with tolerances close to the size of the restraint member 21 in order to tightly hold the restraint member 21 by friction. Alternatively, the restraint holder 18 may include a thumbscrew 28 which may be tightened to hold the restraint member 21. Alternatively, the restraint member 21 may have holes for receiving a pin for immobilizing the restraint member 21.

Optionally, additional restraint holders 18 may be attached to the plate 12 to hold multiple restraint members 21 to permit more secure restraint of insulation or other flexible materials. Further, having two restraint holders 18 on opposite sides of the lever 22 would permit the restraint apparatus 10 to be used to extend a restraint member 21 in either direction, unlike the conventional bent rebar restraining device that is asymmetric, or stated another way is either left-hand or right-hand. As shown in FIG. 2, an optional support 23 for the lever 22 permits the use of a single restraint holder 18 that allows a restraint member 21 to extend fully across the width of the plate 12 without interfering with the movement of the lever 22.

Figure 5:
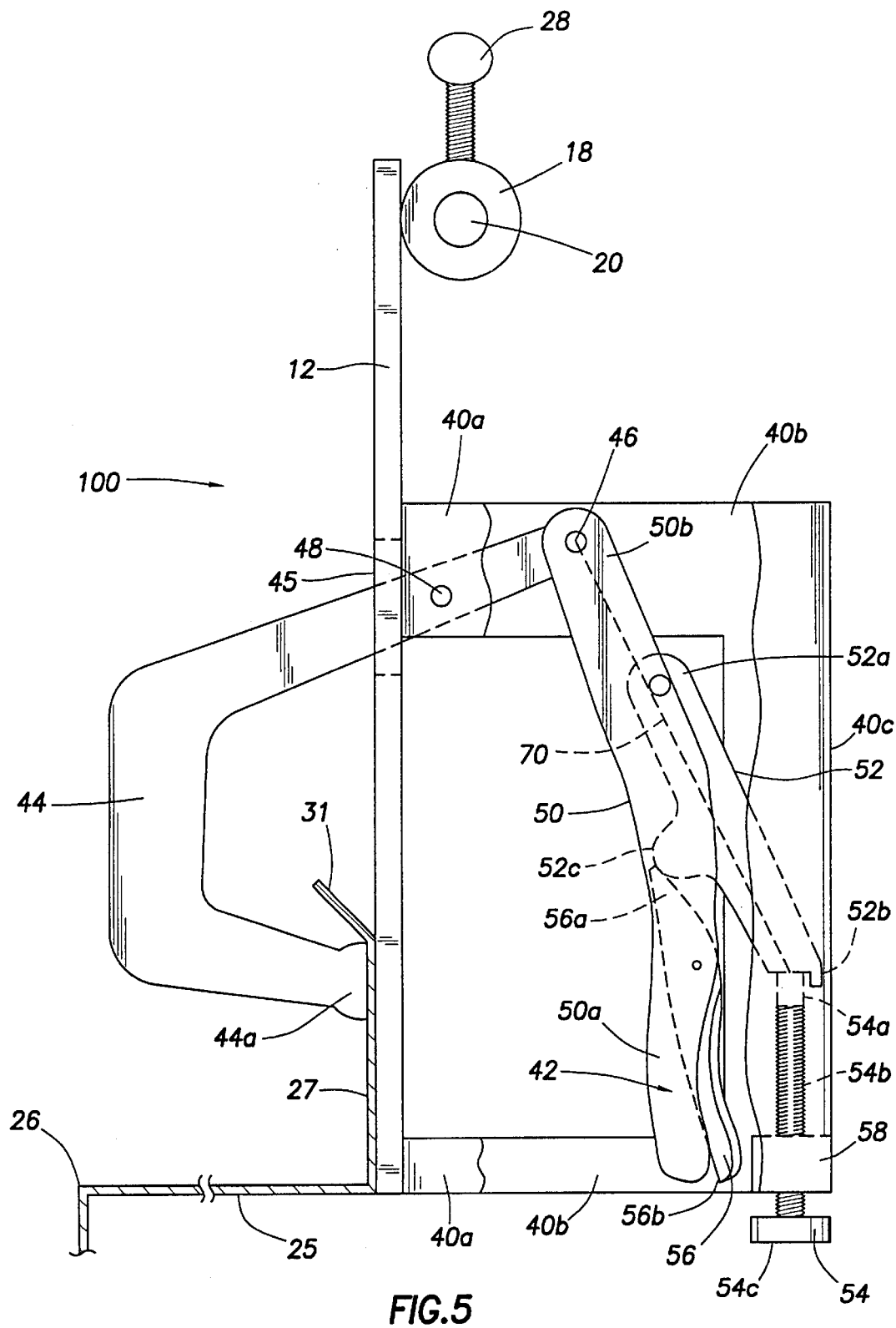
FIG. 5 is a side view in partial section of another embodiment of the restraint apparatus showing a reinforcing brace and handle for engaging and locking a hook member.

Another embodiment of the restraint apparatus according to the present invention, generally designated 100, is shown in FIG. 5. The restraint apparatus 100 is similar in many respects to the restraint apparatus 10. The restraint apparatus 100 is adapted to permit one-handed control when engaging and disengaging the restraint apparatus 100 to the girt 26. A pair of brace members 40a and 40b are attached to the back face of the plate 12. A handle assembly 42 is attached between the brace members 40a and 40b. The brace members 40a and 40b typically have a C-shape to support the handle assembly 42 and to protect a worker's hand from being struck by a girt 26 while working with the apparatus 100. Preferably, the pair of brace members 40a and 40b are joined together at the outer portion 40c. A hook member 44 is pivotally connected to a pin 48 that extends between the brace members 40a and 40b. The hook member 44 extends through an opening 45 in the plate 12. The handle assembly 42 is connected to the hook member 44, preferably pivotally connected with a pin 46.

The handle assembly 42 included a first and second handle members 50 and 52, respectively, a locking screw 54 and a release member 56. As shown in FIG. 5, the first handle member 50 is pivotally connected to the hook member 44 with the pin 46. The first handle member 50 includes a lower gripping portion 50a. The second handle member 52 is pin-connected to the first handle member 50 at end 52a. The second end 52b of the second handle member 52 is in contacting relationship with an end 54a of the locking screw 54. The second handle member 52 includes a bulbous medial portion 52c for reasons which will be explained below. The locking screw 54 includes a threaded shaft 54b which is threadedly engaged with a mounting nut or threaded coupler 58 which is secured to the brace members 42a and 42b. The locking screw 54 includes a head 54c for adjusting the portion of the end 54a. The release member 56 is preferably pin connected to the first handle member 50, preferably to the lower gripping portion 50a. The release member 56 has an upper end 56a which is adapted to contact the bulbous portion 52c of the second handle member 52. The release member 56 includes a lower portion 56b which is adapted to be moved towards the first handle member 50 to release the handle assembly 42.

As the gripping portion 50a of the first handle member 50 is moved towards the plate 12, the hook member 44 opens to permit a girt 27 to be inserted between the hook point 44a and the plate 12. Moving the gripping portion 50a towards the locking screw 54 engages the girt vertical extension 27 between the hook point 44a and the plate 12.

It is to be understood that the amount of gripping force required to lock the apparatus 100 can be varied by adjusting the locking screw 54. Preferably, in the locked position of the restraint apparatus 100, the pin connection at 52a is slightly to the right of a centerline 70 extending from the pin 46 to the top end 54a of the locking screw 54. Additionally, in the locked position the bulbous portion 52c is contacting the upper end 56a of the release member 56 which serves to limit further movement in this direction. In order to open the restraint apparatus 100, the lower portion 56b of the release member 56 is pivoted towards the gripping portion 50a which causes the upper end 50b of the first handle member 50 to rotate slightly clockwise about the pin connection at 52a until the pin connection at 52a is to the left of the centerline 70 at which time the second handle member 52 is allowed to pivot in a counterclockwise direction about its lower end 52b. This in turn lowers the upper end 50b to the first handle member 50 and pivots the hook member 44 to an open position. Although not shown, the hook member 44 could be biased to an open position, as for example with a spring, to allow easier installation onto the girt.

As above described, the handle assembly 42 prevents the apparatus 100 from accidentally disengaging from the girt 26. Further, the locking screw 54 can be adjusted to accommodate various girt wall thicknesses.

The present invention also includes a method of restraining movement of insulation or other flexible materials during the construction of a metal frame building. The method comprises attaching insulation 11 or other flexible material to an eave strut and attaching the restraint apparatus 10 or 100 to a girt 26 adjacent to the insulation. A restraint member 21 is installed into the restraint holder 20 such that the restraint member 21 extends substantially across the width of the insulation 11. One or more restraint apparatus 10, 100 may be used as necessary for strips of insulation or other flexible materials that extend from the eave strut to provide the necessary restraint at various points along the length of the insulation 11 or other flexible material. One of ordinary skill in the construction of metal frame buildings will understand that the order of the steps in not critical and may be performed in an order other than that indicated above and still provide satisfactory results. For example, the restraint apparatus 10, 100 with restraint member 21 may be attached to the girts 26 prior to the insulation being installed between the girts 26 and the restraint members 21. Further, the insulation 11 may be installed from bottom (ground) to the eaves or vice versa.

It is to be understood that the restraint apparatus 100 is attached to a girt by lowering the open hook member over the angled portion 31 of a girt 26 via the gap and squeezing the first handle member 50 to engage the girt 26. The restraint apparatus 100 permits a single-handed operation for the attachment of apparatus 100 to a girt 26.

According to the present invention the apparatus 10, 100 allows a builder to restrict the movement of insulation on a windy day by attaching the apparatus 10, 100 to a girt 26 during the installation of the insulation and siding. The apparatus 10, 100 provides improved safety over the existing use of rebar with a U-shaped end. The present invention is particularly well suited for restricting the movement of insulation during the construction of metal frame buildings. However, it is to be understood that the present invention is likely suitable for various other applications.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A restraint apparatus adapted to attach to a structural girt for restraining a width of insulation during construction of a metal frame building, the apparatus comprising:

a plate having an opening;

a hook member received by said opening, said hook member having a hook point, said hook point and said plate adapted to cooperatively engage opposite sides of the girt therebetween;

a restraint holder attached to said plate; and a restraint member received by said restraint holder, wherein said restraint holder comprises a threaded member to secure said restraint member.

2. The restraint apparatus of claim 1, wherein said restraint member is capable of extending substantially across the width of insulation.

3. The restraint apparatus of claim 1, further comprising a lever and a rod, said rod communicating lever movement to said hook member to engage a girt with said hook member.

4. The restraint apparatus of claim 1, wherein said hook member is sized and shaped to receive a portion of the girt.

5. A restraint apparatus for restraining a width of flexible material adjacent a horizontal building girt having a horizontal axis during construction of a metal frame building, the apparatus comprising:

a removable clamp assembly adapted to securely engage opposite sides of the horizontal building girt, said clamp assembly having a locked position and an unlocked position, said clamp assembly adapted to securely engage the building girt in the locked position and be removed from the building girt in the unlocked position, said clamp assembly exerting a horizontal clamping force perpendicular to the girt horizontal axis in the locked position;

a restraint holder attached to said clamp assembly;

an elongate restraint member connected to said restraint holder, said elongate restraint member is capable of extending substantially across the width of flexible material, said elongate restraint member having a longitudinal axis perpendicular to said clamping force, wherein said elongate restraint member longitudinal axis and said clamping force of said clamp assembly capable of being horizontal when said clamp assembly is securely engaged to the horizontal building girt, and wherein said restraint holder comprises a threaded member to secure said restraint member.

6. The restraint apparatus of claim 5, wherein said elongate restraint member is adapted to be substantially parallel with the horizontal building girt and substantially parallel with the width of flexible material when said clamp assembly securely engages the building girt in the locked position.

7. The restraint apparatus of claim 5, wherein said restraint holder is attached to said clamp assembly in a position such that said elongate restraint member is adapted to be either above or below the horizontal building girt when said clamp assembly securely engages the horizontal building girt in the locked position.

8. The restraint apparatus of claim 7, wherein said elongate restraint member is adapted to be substantially parallel with the horizontal building girt when said clamp assembly securely engages the building girt in the locked position.

9. The restraint apparatus of claim 5, wherein said elongate restraint member is adapted to be substantially parallel with the horizontal building girt when said clamp assembly securely engages the building girt in the locked position.

10. The restraint apparatus of claim 5, wherein said elongate restraint member has a length greater than six feet.

11. The restraint apparatus of claim 5, wherein said elongate restraint member restrains the flexible material along the length of said elongate restraint member.

12. A restraint apparatus for restraining a width of flexible insulation adjacent a horizontal girt having a horizontal axis during the installation of siding to a frame building, the flexible insulation intended to extend between a vertical extension of the horizontal girt and the siding as the siding is attached to the vertical extension of the horizontal girt, the apparatus comprising:

a removable clamp assembly adapted to securely engage opposite sides of the horizontal girt, said clamp assembly having a locked position and an unlocked position, said clamp assembly adapted to securely engage the horizontal girt in the locked position and be removed from the horizontal girt in the unlocked position, said clamp assembly exerting a horizontal clamping force perpendicular to the girt horizontal axis in the locked position;

an elongate restraint member connected to said clamp assembly, said elongate restraint member having a longitudinal axis perpendicular to said clamping force, said elongate restraint member having a length sufficient to restrain the entire width of the flexible insulation adjacent the horizontal girt along said restraint member length, wherein the flexible insulation is between the horizontal girt and said elongate restraint member.

13. The restraint apparatus of claim 12, wherein said elongate restraint member is capable of extending substantially across the width of flexible insulation.

14. The restraint apparatus of claim 12, wherein said elongate restraint member has a length greater than six feet.

15. The restraint apparatus of claim 12, wherein said elongate restraint member is adapted to be substantially parallel with the horizontal girt and substantially parallel with the width of flexible insulation when said clamp assembly securely engages the horizontal girt in the locked position.

* * * * *